United States Patent [19]

Iltis et al.

[11] Patent Number: 4,929,574
[45] Date of Patent: May 29, 1990

[54] ELECTROMAGNETIC WAVE ABSORBERS COMPRISED OF BARIUM TITANATE POWDERS

[75] Inventors: Alain Iltis, Aubervilliers; Patrick Maestro, Fosses, both of France

[73] Assignee: Rhone-Poulenc Chimie, Courbevoie, France

[21] Appl. No.: 330,484

[22] Filed: Mar. 30, 1989

[30] Foreign Application Priority Data

Mar. 30, 1988 [FR] France .................................. 88 04168

[51] Int. Cl.$^5$ .............................................. C04B 35/46
[52] U.S. Cl. ..................................... 501/137; 501/138; 29/631.1; 524/413
[58] Field of Search ............... 501/137, 138; 29/631.1; 524/413

[56] References Cited

U.S. PATENT DOCUMENTS

| | | | |
|---|---|---|---|
| 4,430,689 | 2/1984 | LaGrange et al. | 501/137 |
| 4,563,661 | 1/1986 | O'Bryan Jr. et al. | 501/137 |
| 4,753,906 | 6/1988 | Nishigaki et al. | 501/137 |
| 4,764,493 | 8/1988 | Liley et al. | 501/137 |

Primary Examiner—Mark L. Bell
Assistant Examiner—Deborah Jones
Attorney, Agent, or Firm—Burns, Doane, Swecker & Mathis

[57] ABSTRACT

Novel compositions containing finely divided barium titanate particulates homogeneously dispersed in a solid organic matrix material, the barium titanate particles having a mean diameter of at least 1 micron, are well adopted for the production of electromagnetic wave absorbers, e.g., seals for microwave ovens.

18 Claims, No Drawings

ELECTROMAGNETIC WAVE ABSORBERS COMPRISED OF BARIUM TITANATE POWDERS

BACKGROUND OF THE INVENTION

1. Field of the Invention:

The present invention relates to novel compositions of matter comprising a barium titanate powder dispersed in an organic matrix and suitable for use as absorbers of electromagnetic waves, in particular microwaves.

This invention also relates to a process for the preparation of finely divided barium titanate especially adapted for the production of such electromagnetic wave absorbers, and to the production of seals from the subject novel compositions, notably seals for microwave ovens.

2. Description of the Prior Art:

Absorbers of electromagnetic waves and, in particular, of microwaves are well known to this art and have been abundantly described in the literature.

The best known and most typically used absorbers are those based on ferro- or ferrimagnetic materials, such as, for example, the ferrites, which are used either in sintered form, or in the form of powders dispersed in organic resins (compare, e.g., U.S. Pat. Nos. 4,003,840, 4,023,174 and 4,414,339).

The use of metallic fabrics as microwave absorbers has also been described. In this case, very fine fibers of metals or alloys, optionally ferromagnetic, are used; they either may or may not be embedded in an organic polymer.

Certain patents (e.g., U.S. Pat. Nos. 4,200,701 and 4,281,072) also describe materials based exclusively on polymers, such as, for example, polypropylene foam, which are suitable for use in the absorption of microwaves.

More practically, in U.S. Pat. No. 4,027,384 microwave absorbers are described which comprise polymers filled with carbon or graphite, i.e., semiconducting fillers.

It too is known that a sintered ferroelectric material such as barium titanate has certain absorbent properties relative to electromagnetic waves, but it has been indicated that these absorbent properties disappear if the product is reduced to powder form. This would explain why absorbers filled with barium titanate have not to date found applications on an industrial scale.

SUMMARY OF THE INVENTION

Accordingly, a major object of the present invention is the provision of novel compositions of matter based on barium titanate which are suitable for ultimate use as absorbents of electromagnetic waves, and more particularly of microwaves.

Another object of the present invention is the provision of an improved process for the preparation of finely divided barium titanate particulates (powder) having properties specifically adapted for the formulation of the above novel compositions, which improved process is simple, efficient, and easily carried out.

Yet another object of this invention is the provision of improved seals, the form and composition of which effectively ensure the tightness of electromagnetic wave generators, in particular microwave ovens.

Briefly, it has now unexpectedly been discovered that compositions based on barium titanate powder dispersed in an organic matrix, and having absorbent properties relative to electromagnetic waves, can indeed be prepared, if said barium titanate powder has certain specific structural and/or compositional characteristics.

In particular, the novel compositions according to the present invention, comprising finely divided barium titanate particulates dispersed in an organic matrix, are characterized in that the mean diameter of the particles constituting the barium titanate powder is greater than or equal to 1 micron.

DETAILED DESCRIPTION OF THE PREFERRED EMBODIMENTS OF THE INVENTION

More particularly according to the present invention, by "mean diameter" is intended that more than 50% of the number of particles constituting the $BaTiO_3$ powder have a diameter, measured by the diffraction of light, greater than or equal to 1 micron.

In addition, the barium titanate powder comprising the compositions of the invention has at least one of the following preferred characteristics:

(a) The finely divided particulates have a mean diameter greater than 10 $\mu m$ and, even more preferably, greater than 100 $\mu m$; a mean diameter ranging from 100 to 200 $\mu m$ is especially advantageous;

(b) The finely divided particulates comprise aggregates of elementary crystals having a mean diameter equal to or greater than 1 $\mu m$;

(c) The barium titanate is present, principally, in quadratic crystalline form, i.e., more than 50% by volume of the $BaTiO_3$ is present in such phase, but preferably this amount of quadratic phase is higher than 90%;

(d) The molar ratio Ba/Ti in the barium titanate is slightly higher than 1; and (e) The strontium content of the barium titanate powder is less than or equal to 1% by weight, preferably less than 0.1% by weight.

The nature of the organic compound constituting the matrix in which the barium titanate powder is dispersed is not critical. The selection of such compound is generally governed by the following two practical criteria: above all, the compound must be easy to use and it should be available at a low cost. By the term "ease of use" is intended the ability to disperse and maintain in dispersion the barium titanate powder such as to provide a homogeneous mixture, and a low blistering tendency, together with good formability.

Thus, especially suitable for such purpose are the thermoplastic polymers and/or copolymers of the polyolefin type, such as, for example, polyethylene and polypropylene, of the vinyl type, such as, for example, PVC, of the styrene type, such as, for example, polystyrene, or of the polyacrylic, polyamide or polyester type, together with natural or synthetic elastomers of the caoutchouc, polybutadiene or silicone type, and, also, the heat-curable polymers and/or copolymers of the aminoplastic, phenoplastic, crosslinked polyester, epoxy and polyurethane type.

The ratio, in percent, of the volume occupied by the dispersed phase ($BaTiO_3$) to the total volume of the composition ($BaTiO_3$+organic phase) advantageously ranges from 15% to 35% and more preferably from 20% to 30%, in order to obtain the best absorbent properties possible. However, if the reflecting characteristics of the composition do not in and of themselves constitute an adverse consequence in certain highly specialized applications, such as, for example, in the case of use as seals for microwave ovens, percentages by volume of BaTiO₃ of up to 60% are tolerated.

In conventional manner, the dispersion according to the invention may be produced simply either by introducing, under agitation, the titanate powder into the organic compound maintained by heating in the molten state and then cooling the resulting homogeneous mixture, or by cold kneading on a rotating cylinder.

The conventional electronic-grade barium titanates (useful, for example, in capacitors) and which are synthesized by various methods per se known to this art, are not intrinsically suitable for direct use in the present invention, particularly in light of their submicronic size (typically ranging from 0.1 to 0.5 μm). It is thus necessary that these powders must be first modified to adapt them to the aforedescribed specific requirements of the invention.

This objective is attained by the treatment according to the invention, which comprises heat treating, at a temperature ranging from 1,100° to 1,600° C., a submicronic powder of barium titanate (electronic quality) which has been produced by any known technique.

A temperature of less than 1,100° C. makes it difficult to obtain the crystalline growth and quadratic structure desired, while a temperature higher than 1,600° C. would result in adverse fusion of the particles.

Preferably, the temperature of the heat treatment ranges from 1,150° to 1,350° C., and even more advantageously is about 1,250° C.

The heat treatment is advantageously carried out in air, but any other atmosphere may be suitable, for example a reducing atmosphere.

In a preferred embodiment of the invention, an additive is included with the barium titanate powder, the primary function of which is to assist the crystal growth. Preferably, this additive is a lithium salt and even more preferably lithium fluoride, LiF. It has also been discovered that the use of such an additive presents the added advantage of significantly increasing the dielectric constant of the final product barium titanate, which is particularly important in the absorber application under consideration.

It is thus possible to produce powders having a dielectric constant appreciably higher than 1,000.

As indicated above, the submicronic powder starting materials according to the present invention may be produced by any means known to this art, provided that the powder to be used in the formulation of the subject novel composition had been subjected, at least once, to the aforesaid heat treatment and without subsequent grinding.

More specifically, these powders may be produced via such representative known techniques as:

(a) a solid-state reaction, at a high temperature (1,000° C.), between a powder of a barium salt containing a volatile anion, for example barium carbonate, and a titanium oxide powder;

(b) precipitation in a liquid organic or aqueous phase, followed by calcination of the resulting precipitate;

(c) precipitation in molten salt baths;

(d) a sol/gel process (see, e.g., FR 2,551,743).

Furthermore, in any of these processes it is possible, by adjusting the operating conditions in conventional and known manner, to arbitrarily produce titanate powders having the properties preferentially required for the preparation of the absorbent compositions, in particular concerning the Ba/Ti ratio and the purity relative to strontium.

Optionally, the additive to assist in the crystal growth, as described above, may be added during the initial syntheses.

The absorbent compositions according to the invention are particularly useful for the production of seals intended to limit or eliminate the leaks, which are harmful to human beings, and which emanate from certain devices generating centimetric waves (microwaves: $2 < \lambda < 15$ cm$^{-1}$), such as, for example, microwave ovens, the domestic use of which is becoming increasingly widespread.

After forming the subject compositions into the shape desired, the seals are placed between the door of the oven and the external rims of the cooking enclosure, in a manner such that the microwaves, by absorption and/or successive reflection, cannot escape from the internal environment of the oven.

In order to further illustrate the present invention and the advantages thereof, the following specific examples are given, it being understood that same are intended only as illustrative and in nowise limitative.

EXAMPLE 1 (Comparative):

A barium titanate powder of electronic quality was prepared by a process as described in FR 2,551,743.

This powder comprised particles having a mean diameter of 0.8 μm, with the particles themselves being an aggregate of elementary crystals, the size of which was on the order of 0.2 to 0.3 micron.

The specific BET surface of the powder was on the order of 4 m²/g.

The Ba/Ti ratio was 1.00±0.01.

This powder was then mixed in a cylinder mixer with plasticized PVC (polyvinylchloride) in a proportion of 65 g barium titanate per 100 g PVC.

The paste obtained was compressed under 50 bars of pressure at 180° in the form of plates having the dimensions (300×300×2 mm).

In this manner, a PVC plate containing 11% by volume BaTiO₃ was produced.

The dielectric constant of this plate was measured at 2.45 Gigahertz. A value of 4.7 was determined for $\epsilon'$ and of 0.02 for $\epsilon''$.

The very low value of $\epsilon''$ indicated a very weak absorption power of the plate in the field of microwaves.

EXAMPLE 2:

The barium titanate powder of electronic quality prepared according to the procedure of Example 1 was calcined at three different temperatures for 12 hours in air, then stripped.

From these three powders, three specimen plates were then prepared and tested according to the procedure also set forth in Example 1.

The results of these measurements, carried out at 2.45 Gigahertz, are reported in Table I:

TABLE 1

|  | Calcining T° | φm* (μm) | $\epsilon'$ | $\epsilon''$ |
|---|---|---|---|---|
| Specimen 1 | 1,150 | 1.1 | 5.43 | 0.15 |
| Specimen 2 | 1,250 | 2.2 | 6.51 | 0.23 |
| Specimen 3 | 1,350 | 10.9 | 5.21 | 0.11 |

*φm designates the mean diameter of the particles constituting the barium titanate present in the specimen.

The high values of $\epsilon''$ at this frequency (2.45 GHertz) and at these concentrations in BaTiO₃ evidenced a very good absorption of the specimens according to the invention in the field of microwaves.

EXAMPLE 3:

The barium titanate powder of electronic quality prepared according to the procedure of Example 1 was calcined at 1,360° C., then dispersed, by kneading, in a silicone elastomer containing a small amount of benzoyl peroxide (crosslinking agent).

A specimen plate was then prepared as in Example 1, except that the resulting plate was then crosslinked at 300° C. in a continuous furnace. It then contained 30.3% by volume of barium titanate.

The results of the measurements of the dielectric constant of this plate (carried out at 2.45 Gigahertz) were the following:

$\epsilon'$: 13.9
$\epsilon''$: 0.5

Relative to the results of Example 2, the very high values of $\epsilon'$ and $\epsilon''$ are indicative of the higher volume content in $BaTiO_3$ in the specimen plate (30.3% versus 11%).

EXAMPLE 4:

To the barium titanate powder of electronic quality, prepared according to the procedure of Example 1, 1.1 mole % lithium fluoride, LiF, was added, whereupon the mixture was calcined at 1,350° C. for 12 hours.

By scanning electron microscopy, a significant growth in the size of crystals during calcination was observed, and crystals larger than 10 μm were determined.

Upon completion of such calcination, a powder having a mean particle size of 23.42 μm was produced.

The resulting powder was dispersed in PVC in a proportion of 45 g $BaTiO_3$ per 100 g PVC.

A specimen plate was then prepared by the procedure of Example 1. This plate contained 8% by volume of $BaTiO_3$.

The results of the measurements of the dielectric constant of this plate (carried out at 2.45 Gigahertz) were as follows:

$\epsilon'$: 4.6
$\epsilon''$: 0.23

In this example also, the results indicated a very strong absorption power in the microwave field.

Furthermore, in light of the lower titanate concentration employed, these results are considered to be even better than those obtained using the specimens of Example 2.

EXAMPLE 5:

The barium titanate powder of electronic quality prepared according to the procedure of Example 1 was calcined at 1,360° C., then dispersed, by kneading, in a silicone elastomer containing a small amount of benzoyl peroxide (crosslinking agent). A seal having a rectangular cross-section (15×3 mm) was then prepared by extrusion, followed by crosslinking at 300° C. in a continuous furnace.

The resulting seal contained 25% by volume of barium titanate.

Leakage tests were then carried out in a microwave oven of 600 Watts (MOULINEX ® Type 410 oven) having apparent seals.

The seal according to the invention was placed into the upper region of the oven.

Leaks were determined by an "APPOLLO MONITOR XI" crystal detector, while the oven contained 250 cm³ salt water.

In the absence of the seal, the leaks measured varied between 3 milliwatts/cm² and more than 10 milliwatts/cm² and more than 10 milliwatts/cm², depending on the position of the detector on the door.

In the presence of the seal according to the invention, the leaks measured varied between 0.3 milliwatt/cm² and 1.2 milliwatt/cm².

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising an electromagnetic wave absorbing amount of finely divided barium titanate particulates homogeneously dispersed in a solid organic matrix material, the mean diameter of such barium titanate particulates being equal to or greater than 1 micron at least 50% by volume of such barium titanate particulates being in the quadratic crystalline state.

2. The composition of matter as defined by claim 1, wherein the mean diameter of such barium titanate particulates is equal to or greater than 10 microns.

3. The composition of matter as defined by claim 2, wherein the mean diameter of such barium titanate particulates is equal to or greater than 100 microns.

4. The composition of matter as defined by claim 2, said barium titanate particulates comprising aggregates of elementary crystals having a mean diameter equal to or greater than 1 micron.

5. The composition of matter as defined by claim 1, wherein at least 90% by volume of such barium titanate particulates being in the quadratic crystalline state.

6. The composition of matter as defined by claim 1, wherein the molar Ba/Ti ratio in such barium titanate particulates is slightly greater than 1.

7. The composition of matter as defined by claim 1, wherein the barium titanate particulates comprise less than or equal to 1% by weight of strontium values.

8. The composition of matter as defined by claim 7, wherein the barium titanate particulates comprise less than 0.1% by weight of strontium values.

9. The composition of matter as defined by claim 1, wherein the ratio by volume of the barium titanate particulates to the total volume of the composition ranges from 15% to 60%.

10. The composition of matter as defined by claim 9, said ratio ranging from 15% to 35%.

11. A process for the preparation of finely divided barium titanate particulates having a mean diameter of at least 1 micron, comprising heat treating a submicronic barium titanate powder at a temperature of from 1,100° to 1,600° C.

12. The process as defined by claim 11, carried out at a temperature of from 1,150° to 1,350° C.

13. The process as defined by claim 12, carried out at a temperature of about 1,250° C.

14. The process as defined by claim 11, further carried out in an air atmosphere.

15. The process as defined by claim 11, carried out in the presence of an affective amount of a lithium salt additive to promote the crystalline growth of the barium titanate particulates.

16. The process as defined by claim 15, said lithium salt comprising lithium fluoride.

17. An electromagnetic wave absorber comprising the composition of matter as defined by claim 1.

18. The electromagnetic wave absorber as defined by claim 17, comprising a seal for microwave ovens.

* * * * *